May 18, 1954     K. L. JONES     2,678,740
ROLLER BED FOR VEHICLES

Filed May 24, 1951     2 Sheets-Sheet 1

INVENTOR.
King L. Jones
BY
ATTORNEY.

INVENTOR.
King. L. Jones

Patented May 18, 1954

2,678,740

UNITED STATES PATENT OFFICE 2,678,740

ROLLER BED FOR VEHICLES

King L. Jones, Hickman Mills, Mo.

Application May 24, 1951, Serial No. 228,077

8 Claims. (Cl. 214—84)

This invention relates to improvements in vehicle beds, and refers more particularly to vehicle beds in which rollers are inserted in the floors or platforms of the beds to facilitate removal of the load from the vehicle. Two types of structure are contemplated; first, a vehicle bed in which a two-part roller is positioned at the rear of the bed, and second, a vehicle bed in which roller sets are mounted at intervals along the length of the bed, the rolls in both cases extending transversely of the beds.

It is recognized that heretofore rollers have been used in the beds of vehicles, such as wagons, trucks, trailers, or the like, to facilitate the removal of the load from the vehicle and, in some instances, separated or two-part rollers, divided centrally to operate as separate entities, have been used. Two-part rollers are designed to unload one-half of the bed at a time, and to do this it is necessary that the rollers on one side of the bed rotate individually and separately from the roll on the opposite side of the bed.

The vehicle bed here described, utilizing but a single roll at the rear of the bed, is designed to permit rotation of the individual rolls on opposite sides of the bed, to lock the rollers in order that they may be rotated together, or to lock either of the rollers against rotation so the adjoining rollers may be rotated separately.

Where a plurality of transverse, divided rollers are used along the length of the vehicle bed, the individual double rollers are mounted in the form of sets which comprise transverse frames with end and central bearing supports, the end bearings designed to support side uprights or stakes to prevent shifting of the load on the bed, as will hereinafter be explained.

An object of the invention, therefore, is to provide two-part rollers, centrally divided, and mounted transversely of the vehicle bed to permit loading and unloading of heavy merchandise, lumber, or other type of heavy freight, longitudinally of the vehicle bed without the necessity of lifting the weight of the commodity from the floor or platform of the bed.

Another object is to provide a vehicle bed with two-part inset rollers, each set of rollers separately rotatable so that one-half of the load may be shifted longitudinally of the platform without disturbing the load on the opposite side of the platform.

A further object is to provide a clutch mechanism by which the rollers on opposite sides of the bed may be separately rotated, or the two-part rollers rotated as a unit.

A still further object is to provide locking mechanism for locking the rolls on one side of the bed and simultaneously permitting free rotation of the rolls on the opposite side of the bed.

Other and further objects will appear from the description which follows.

In the accompanying drawings, which form a part of the specification and are to be read in conjunction therewith, there are shown embodiments of the invention, and in the various views like reference numerals are used to indicate like parts.

Figure 1:
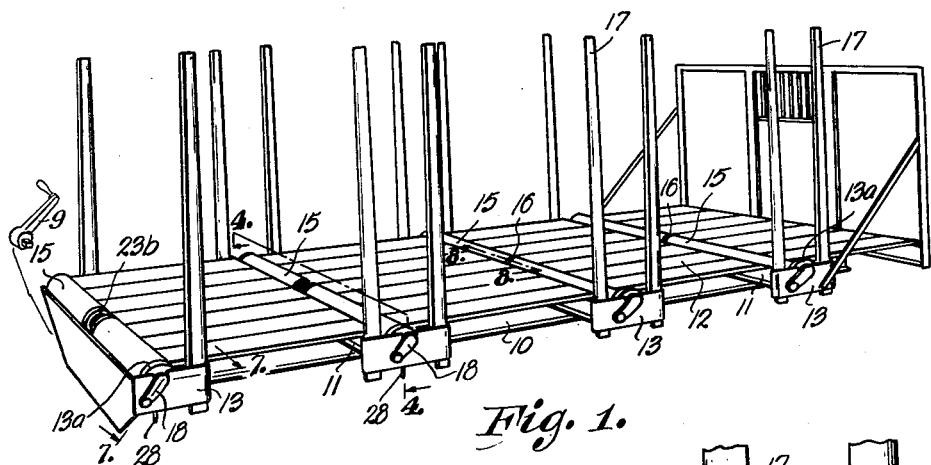
Fig. 1 is a perspective view of a truck bed which embodies the invention, the frame and chassis of the truck being omitted.
Figure 3:
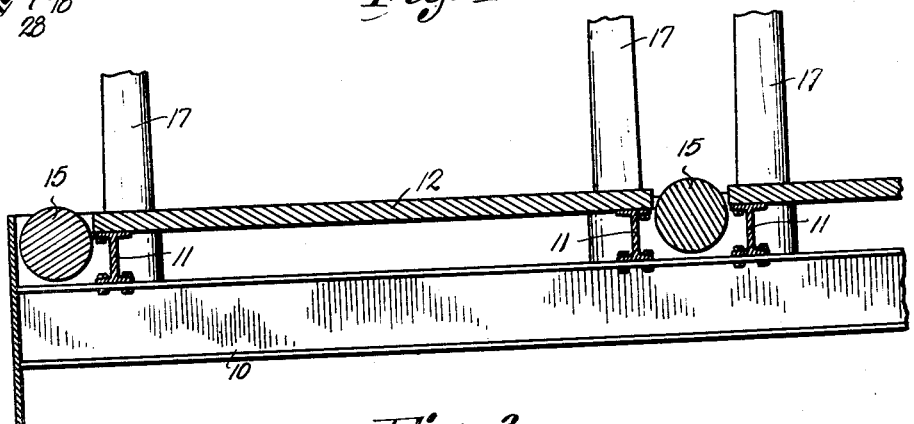
Fig. 3 is an enlarged longitudinal section of a portion of the bed shown in Fig. 1.
Figure 2:
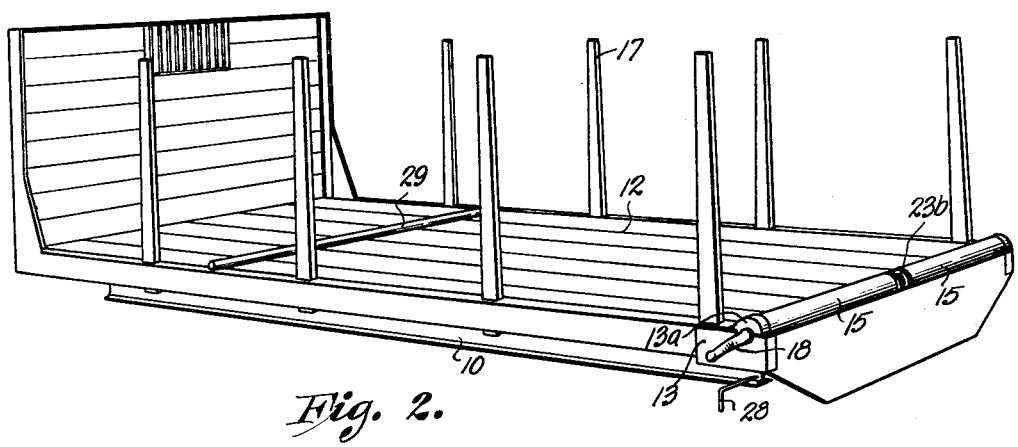
Fig. 2 is a perspective view of a truck bed showing the divided rolls only at the rear end.
Figure 8:
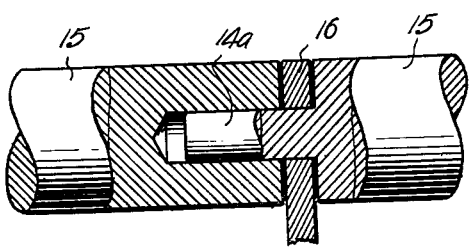
Fig. 8 is a view taken along the line 8—8 in Fig. 1, in the direction of the arrows.

Referring to the drawings, and particularly to Figs. 1 and 2, at 10 are shown longitudinal sills or beams which support the bed and are mounted on the frame of the vehicle. Above and transversely of the sills 10 are cross-members 11, bolted to the sills and carrying the platform or floor 12. At the ends of the cross-members 11 are bearing supports 13 which span the ends of the cross-members and support the bearings 13a. The outboard ends of the shafts 14 upon which half rollers 15 are mounted are carried by and run in bearings 13a. Midway of the bed and mounted between the cross-members 11, are central bearing plates 16, best shown in Figs. 4, 5 and 6. Upon these central bearing plates or supports 16 are mounted the inboard ends 14a of the shafts carrying the divided rollers. The structural details of the central bearing are shown in Fig. 8. It will be noted in this figure that shaft 14a extends as a stub shaft from one roller and fits into a socket or hole drilled in the opposite roller. The stub shaft bears in the plate 16 which forms a support for both of the rollers.

In the modification shown in Fig. 2, a single roller unit is positioned at the rear end of the bed. The divided roll assembly and structural features of the end bearing supports, the locking mechanism for the individual half rolls, and the clutching mechanism, are preferably the same as those shown in Fig. 1 where the roller units are located at intervals along the bed. Along the sides of the bed are upright stakes 17. These stakes in the roller units, shown in Fig. 1, are insertable into pockets on opposite sides of the roller bearings and prevent the load from shifting laterally on the bed.

Figure 7:
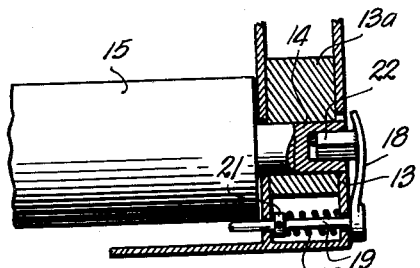
Fig. 7 is a view taken along the line 7—7 in Fig. 1, in the direction of the arrows.

The locking mechanism for the divided rolls is located on the outboard ends of the respective half rollers. The structural features of the locking mechanism are detailed in Fig. 7, and comprise a pivoted keeper 18 rotatable on a pin or shaft 19 carried by the bearing support 13. Around the shaft is a coil spring 20 confined between the outer wall of bearing support and an adjustable stop washer 21. On the inside face of the keeper 18 is affixed a locking member 22 which is square shaped in cross-section and adapted to fit a square socket formed in the outboard end of each shaft 14. A locking mechanism of this type is mounted at the end of each of the roller shafts and serves either to hold the shaft rigid or, when released, permit free rotation of the individual divided rollers. To rotate one of the divided rollers when the lock has been withdrawn from the socket in the end of the shaft, a crank 9 with a squared end is applied to the end of the roller and the roller then rotated manually.

Figure 4:
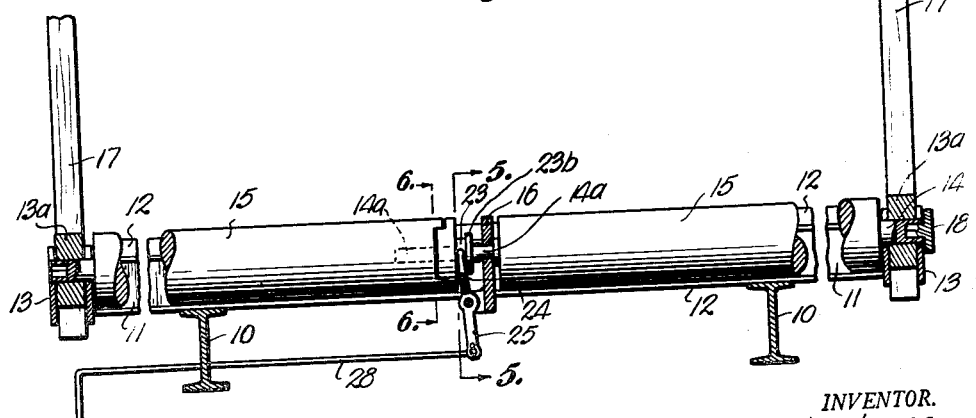
Fig. 4 is a view taken along the line 4—4 in Fig. 1, in the direction of the arrows.
Figure 5:
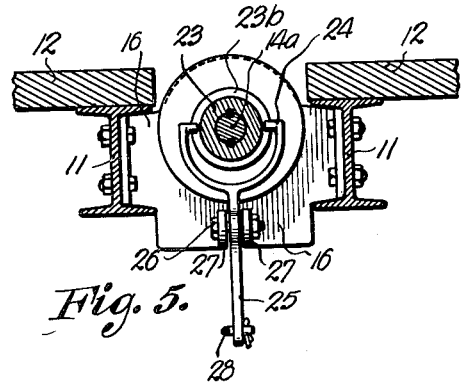
Fig. 5 is a view taken along the line 5—5 in Fig. 4, in the direction of the arrows.
Figure 6:
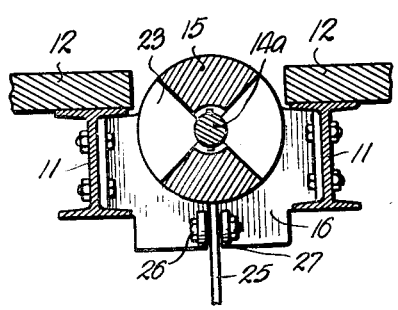
Fig. 6 is a view taken along the line 6—6 in Fig. 4, in the direction of the arrows.

A clutch mechanism is mounted between the divided rollers in some of the roller units, as shown in Fig. 4, and details of the clutch are shown in Figs. 4, 5 and 6. This clutch mechanism may be used only on the divided roller at the rear of the bed or on one or more of the selected rollers along the length of the bed with the divided rollers at other locations equipped with a central bearing such as that shown in Fig. 8. In other words, the clutch mechanism may be used on each roller unit along the length of the bed, or only on selected roller units with the remaining roller units equipped with a central bearing, such as that shown in Fig. 8. The clutch mechanism consists of a clutch member 23 keyed to and slidably mounted on shaft 14a, as shown in Figs. 5 and 6. One face of the clutch member is machined in quadrants, as shown at 23a in Fig. 6. These raised or profiled quadrants on the clutch face fit into corresponding depressions machined into the end of the roller which abuts the face of the clutch. The opposite end of the clutch member is flanged, as shown at 23b in Figs. 4 and 5, and behind the rim of the flange fits the yoke 24 of the actuating lever 25. Clutch actuating lever 25 is pivoted at 26 in ears 27 extending out from bearing bracket 16. Attached to the lower end of the actuating lever is a control rod 28 which extends from the lower end of the actuating lever or shifting yoke 25 to the side of the bed, where it is turned down in the form of a handle for manual shifting of the clutch member. Manipulation of the clutch into engagement with the roller causes simultaneous rotation of both of the divided rollers, while unclutching of the roller permits each of the divided rollers to be manually rotated separately and individually by the ratchet crank previously mentioned.

It should be appreciated from the construction shown in Fig. 1 that the individual roller bed units are adaptable to be mounted on the sills of any commercial vehicle. These roller bed units consist of the cross-members, the end bearing supports designed with sockets for the upright stakes, divided rollers carried in end and central bearings with or without the clutch mechanism as described. These individual roller bed units are mountable at spaced intervals along the bed, or one of the roller bed units can be positioned at the rear of the vehicle bed, as shown in Fig. 2, and a portable roller bar 29 employed to support the front of the load.

Thus, it will be seen that there has been provided a vehicle bed with divided roller units adapted to be mounted either at the rear of the bed or at spaced intervals along the length of the bed, which divided rollers may be operated simultaneously as unitary rollers, or individually as half rollers, locks being provided on the outboard ends of the individual half rollers to hold the divided rollers against rotation while rollers on the opposite side of the platform are being rotated. The advantages to be gained by being able to shift heavy commodities lengthwise along one-half of the platform or floor of the vehicle without disturbing the load on the other half, or being able to shift the load as a unit if desired, are obvious.

From the foregoing it will be seen that this invention is one well adapted to attain all of the ends and objects hereinabove set forth, together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A roller bed unit adapted to be mounted on a vehicle and forming a part of the vehicle bed, comprising a pair of parallel supporting members extending transversely across the bed, a two-part roller disposed between the supporting members with its axis parallel thereto, bearing supports spanning the ends of the supporting members carrying outside bearings for the rollers, central bearing supports between the supporting members and carrying bearings for the inboard ends of the divided rollers, a clutch mechanism engageable with one of the divided rollers for rotating the two-part rollers as a unit, and disengageable when operating the two-part rollers individually.

2. A roller unit as in claim 1 with a locking mechanism at the outboard end of each divided roller.

3. In a roller unit for a truck bed of the type having longitudinal frame members, the improvement which comprises an elongate cross frame mountable on said members, a pair of coaxial rolls aligned parallel to said cross frame, a central bearing carried by the cross frame and positioned between adjacent inboard ends of the two rolls, a pair of bearings carried by the cross frame adjacent the outboard ends of the respective rolls, said rolls supported by said bearings for independent rotation about their common axis, driving means engageable with either roll to turn same, a clutch positioned between the adjacent inboard ends of the two rolls, said clutch comprising a jaw connected to one of said rolls for rotation therewith and normally spaced axially from the end of the other roll, and means for closing said space to engage the jaw with said other roll.

4. In a roller unit for a truck bed of the type having longitudinal frame members, the improvement which comprises an elongate cross frame mountable on said members, a pair of coaxial rolls aligned parallel to said cross frame, a central bearing carried by the cross frame and positioned between adjacent inboard ends of the two rolls, one of said rolls having at its inboard end a trunnion journaled in said bearing and projecting therethrough, the inboard end of the other roll being journaled on the projecting portion of said trunnion, a pair of bearings carried by said cross frame adjacent the outboard ends of the respective rolls and supporting the latter, whereby said rolls are independently rotatable about their common axis, a clutch operable to connect the rolls together to turn as a unit, said clutch including a member adjacent the inboard end of said other roll, said member carried on the projecting portion of said trunnion and having a splined connection with the trunnion whereby it is movable axially toward and away from the inboard end of said other roll, said member and other roll having complementary jaws arranged to mesh upon predetermined movement of the member toward the other roll.

5. A roller unit as in claim 4 wherein the outboard end of each of said rollers contains a noncircular socket extending axially inward from the end thereof, and a driving member having a complementary noncircular stub insertable in said socket to turn the roll.

6. In a roller unit for a truck bed of the type having longitudinal frame members, the improvement which comprises an elongate cross frame mountable on said members, a pair of coaxial rolls aligned parallel to said cross frame, a central bearing carried by the cross frame and positioned between adjacent inboard end of the two rolls, one of said rolls having at its inboard end a trunnion journaled in said bearing and projecting therethrough, the inboard end of the other roll being journaled on the projecting portion of said trunnion, a pair of bearings carried by said cross frame adjacent the outboard ends of the respective rolls and supporting the latter, whereby said rolls are independently rotatable about their common axis, the outboard end of each of said rolls containing a noncircular socket extending axially inward from the end thereof, an arm carried by said cross frame for swinging movement about an axis parallel to the axis of said rolls, and so located that the free end of the arm is movable from a position aligned with the axis of the rolls to a position displaced relative thereto, said arm carrying at its free end a noncircular stub complementary in shape to said socket and insertable therein when said arm is in said first position, thereby to lock the associated roll against rotation.

7. A roller as in claim 6 wherein said stub is spring-biased axially toward the outboard end of said roll to retain the stub in said socket.

8. In a truck bed having a frame, a pair of independently rotatable coaxial rolls mounted on said frame with their common axis crosswise of the bed, a driving member engageable with either roll to turn same independently of the other, and a clutch between the adjoining ends of the two rolls for connecting same together to turn as a unit, said clutch comprising a member having a splined connection with one of said rolls and movable axially toward the other roll, said member and other roll having complementary jaws arranged to mesh upon such movement and connect the two rolls for movement together.

References Cited in the file of this patent

UNITED STATES PATENTS

| Number | Name | Date |
| --- | --- | --- |
| 151,253 | Tothammer et al. | May 26, 1874 |
| 365,530 | McFaul | June 28, 1887 |
| 1,204,049 | Maxwell | Nov. 7, 1916 |
| 1,390,321 | Waters et al. | Sept. 13, 1921 |
| 1,425,599 | Lister | Aug. 15, 1922 |
| 1,455,977 | Wentz | May 22, 1923 |
| 1,931,484 | Bosserdet et al. | Oct. 24, 1933 |
| 2,290,460 | Winsor | July 21, 1942 |
| 2,391,272 | Rose | Dec. 18, 1945 |
| 2,451,620 | Holmes | Oct. 19, 1948 |
| 2,534,057 | Pride | Dec. 12, 1950 |
| 2,584,240 | Stewart | Feb. 5, 1952 |
| 2,585,046 | Schofield | Feb. 12, 1952 |
| 2,665,019 | Lorimer | Jan. 5, 1954 |

FOREIGN PATENTS

| Number | Country | Date |
| --- | --- | --- |
| 373,604 | Great Britain | May 23, 1932 |